Nov. 28, 1933.  C. C. WICKWIRE  1,937,078
WIRE FABRIC MACHINE
Filed Jan. 23, 1932  10 Sheets-Sheet 1

Inventor
Charles C. Wickwire
By Dodge and Sons
Attorneys

Nov. 28, 1933.    C. C. WICKWIRE    1,937,078
WIRE FABRIC MACHINE
Filed Jan. 23, 1932    10 Sheets-Sheet 3

Inventor
Charles C. Wickwire
By Dodge and Ins.
Attorneys

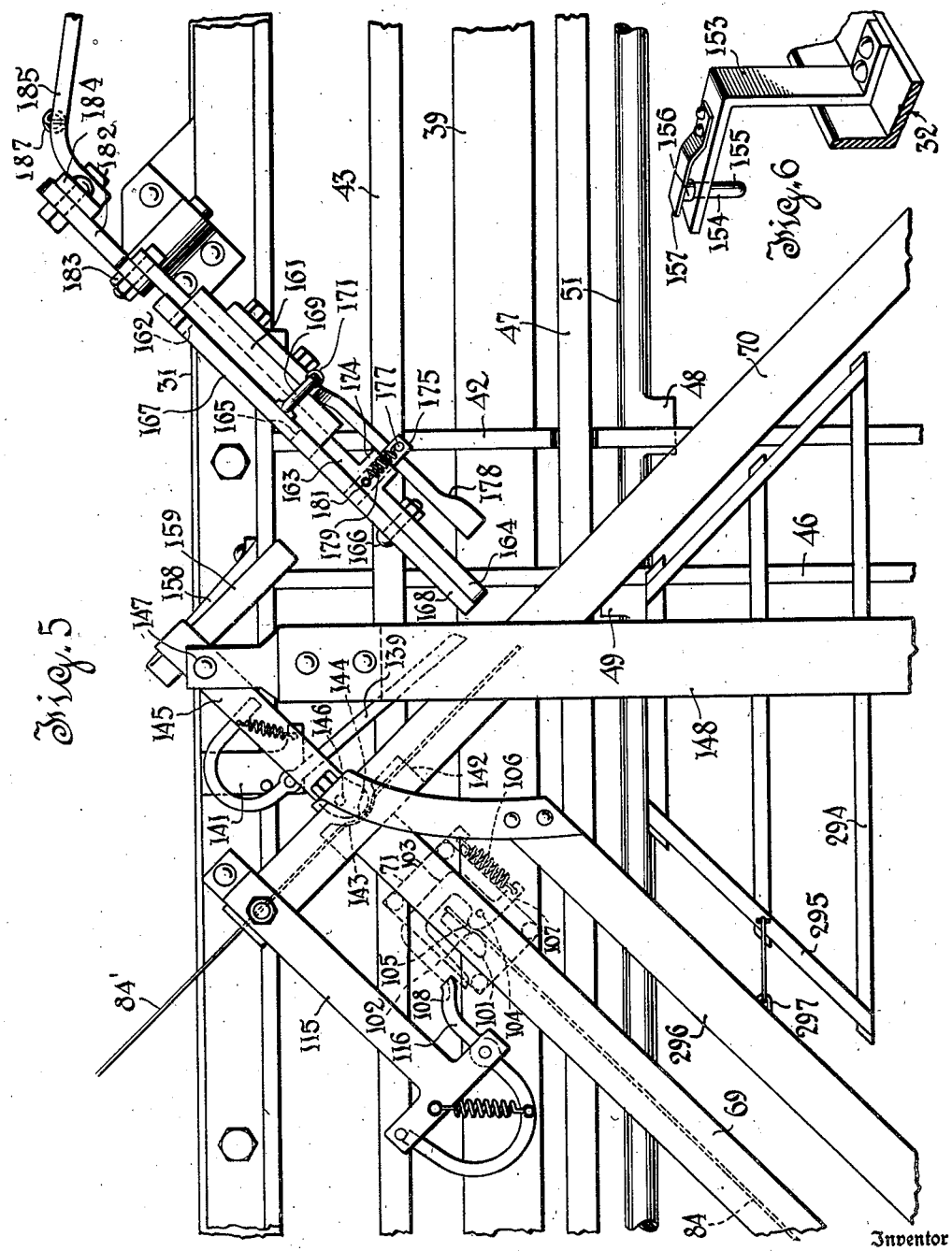

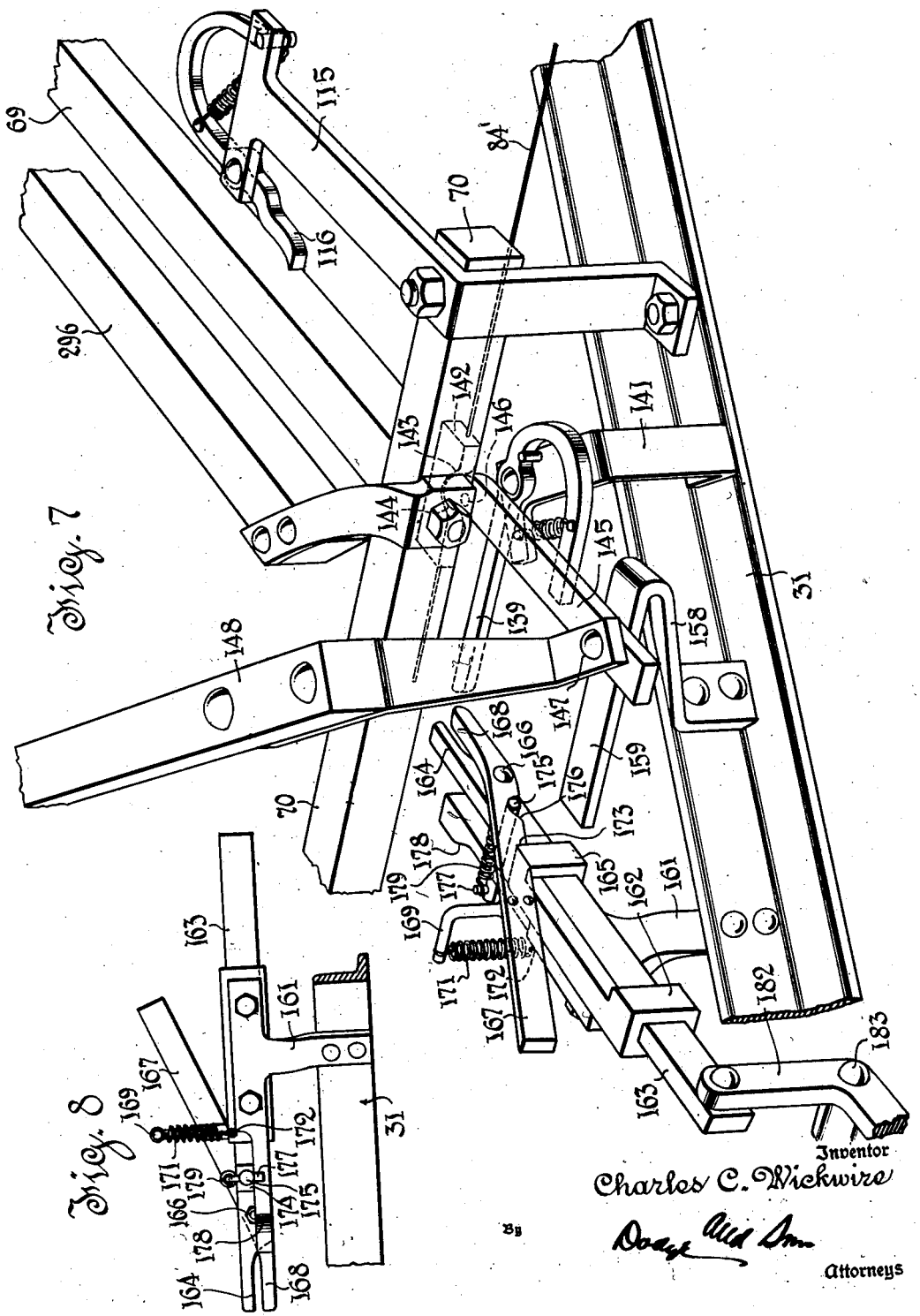

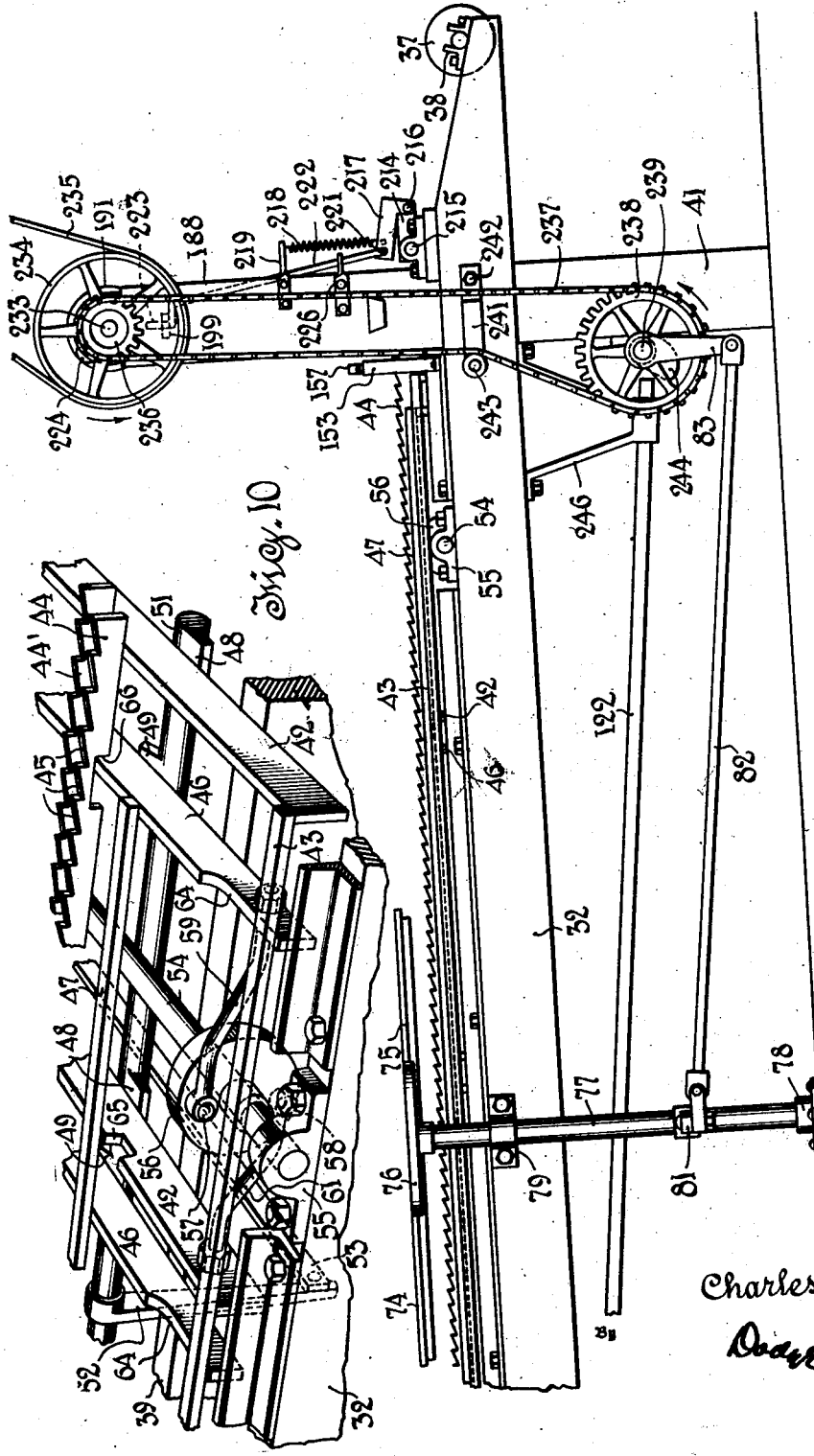

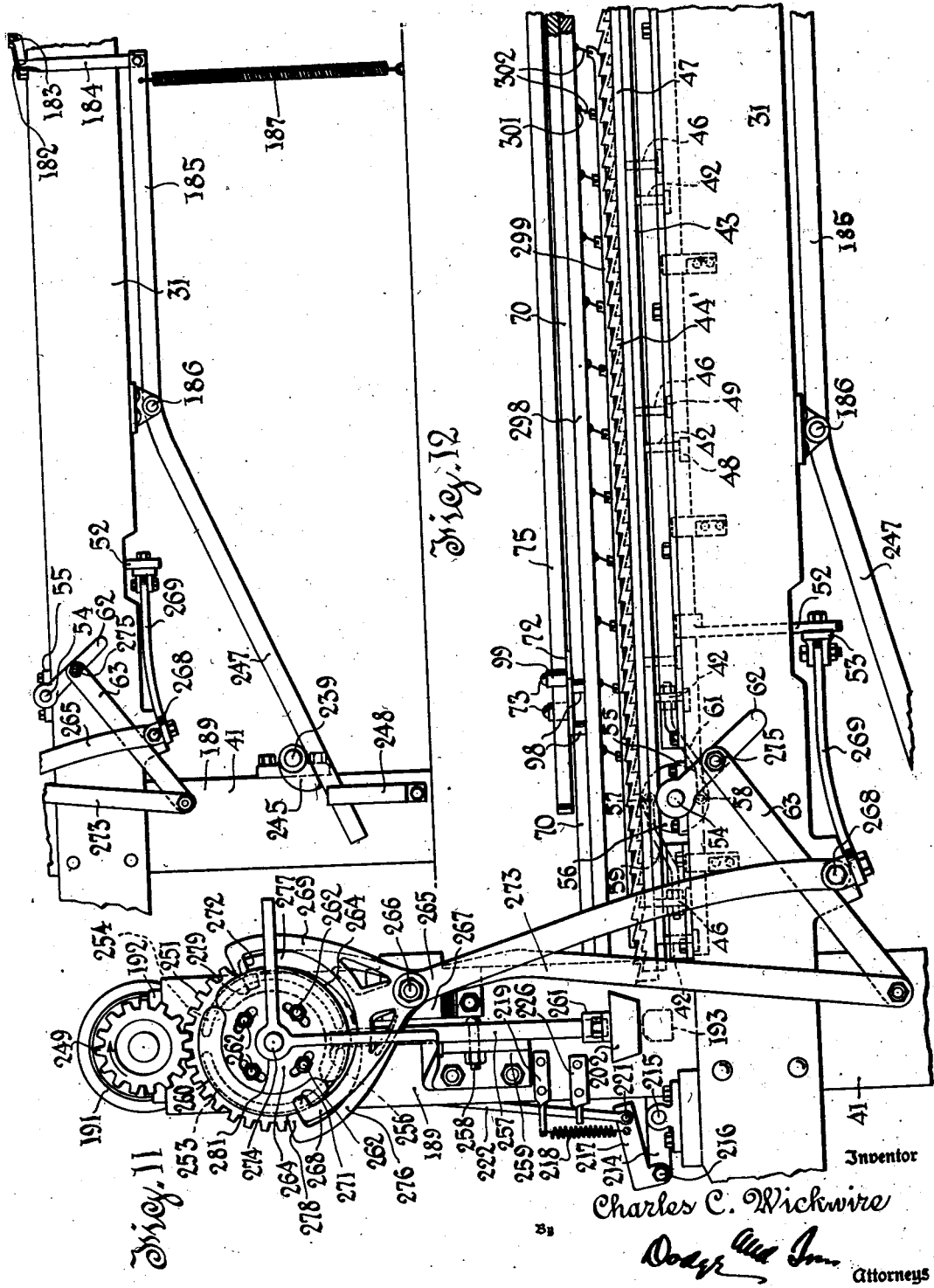

Nov. 28, 1933.   C. C. WICKWIRE   1,937,078
WIRE FABRIC MACHINE
Filed Jan. 23, 1932   10 Sheets-Sheet 8

Inventor
Charles C. Wickwire
By Dodge and Son
Attorneys

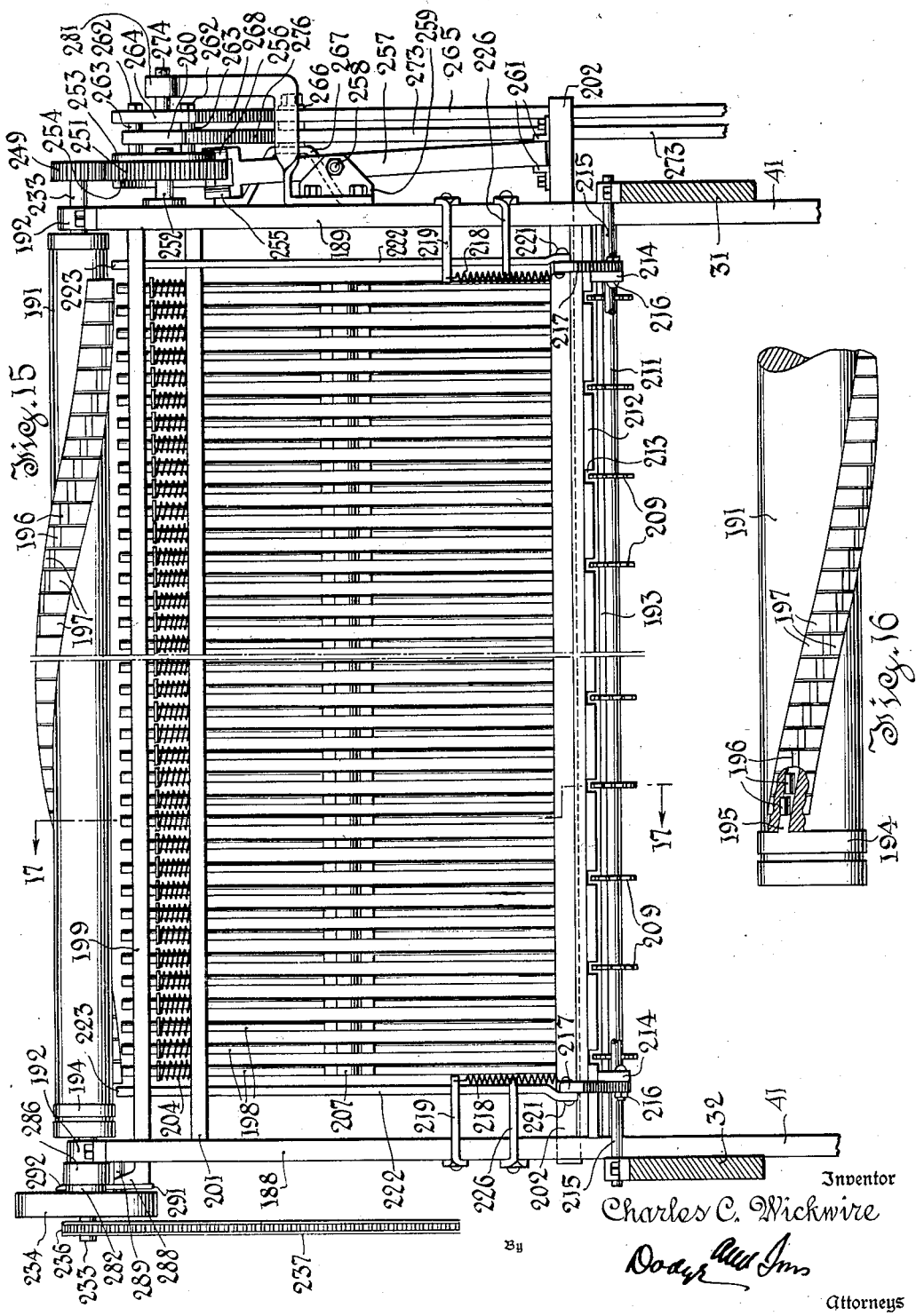

Nov. 28, 1933.  C. C. WICKWIRE  1,937,078
WIRE FABRIC MACHINE
Filed Jan. 23, 1932   10 Sheets-Sheet 10
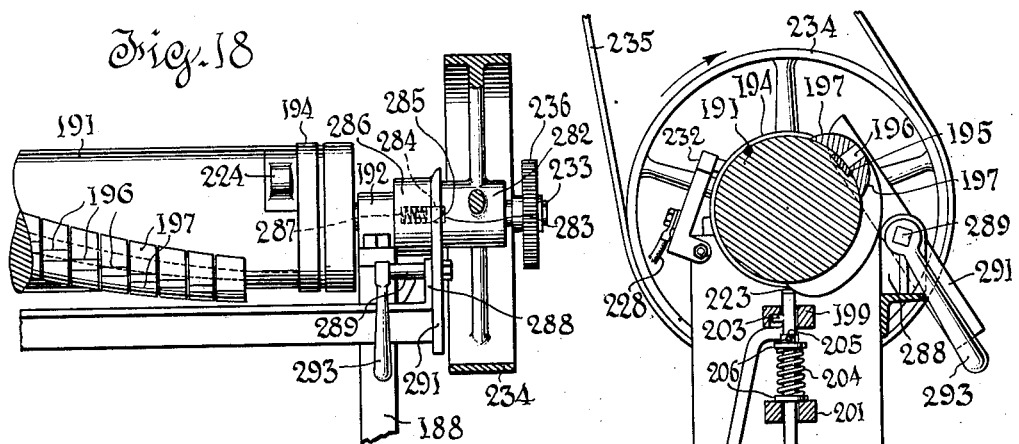
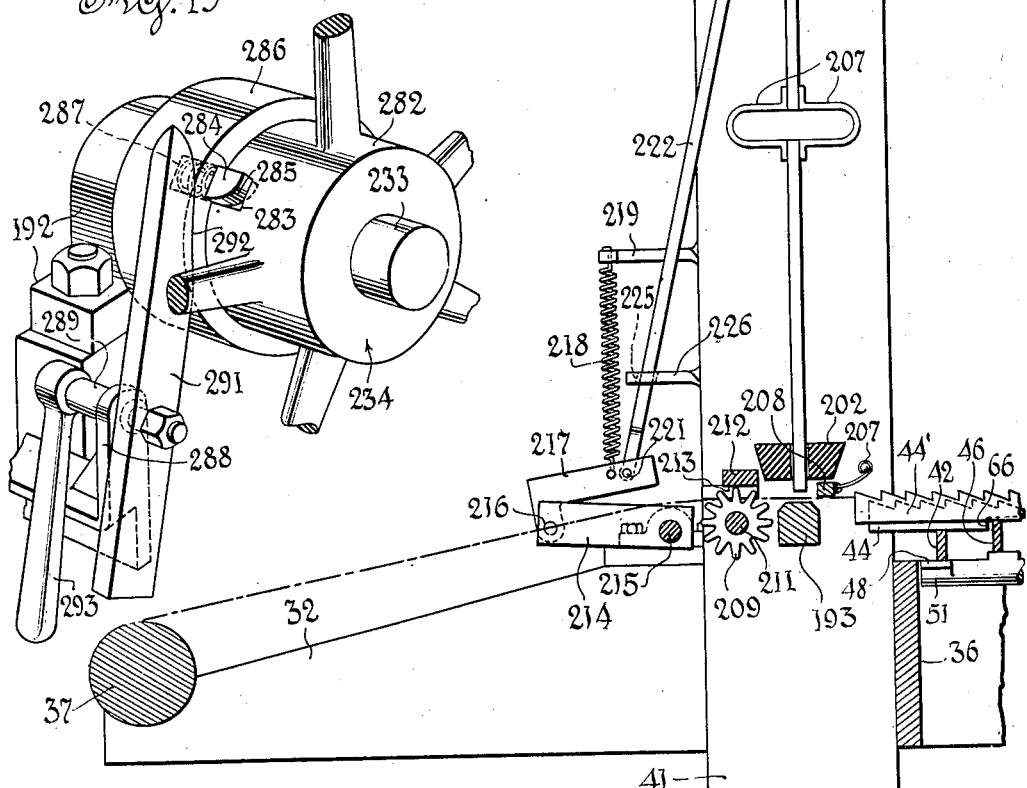
Inventor
Charles C. Wickwire
By Dodge and Sons
Attorneys Patented Nov. 28, 1933

1,937,078

UNITED STATES PATENT OFFICE

1,937,078

WIRE FABRIC MACHINE

Charles C. Wickwire, Cortland, N. Y., assignor to Wickwire Brothers, Cortland, N. Y., a corporation of New York Application January 23, 1932. Serial No. 588,455

25 Claims. (Cl. 140—112)

This invention relates to machines for manufacturing welded wire fabrics of the type in which the strands pass diagonally with reference to the length of the fabric to produce a diamond mesh. Although the most common form of mesh is that in which the two sets of strands cross each other at right angles so that the openings are squares (set diagonally) rather than rhombs, the angle of crossing is subject to variation and is determined by the initial adjustments of the machine. The strands of the fabric are not interwoven, but all strands of one oblique set overlie the strands of the other set, with no selvage reinforcement.

In the prior art, machines for making wire fabric have usually fed the wire to welding mechanism from reels, but I propose to employ a reciprocating feeding bed structure upon which the wires are laid in crossed relation and then fed to the welding mechanism. In bringing this about, the wire is withdrawn from a spool to a definite length and then stretched to straighten it, and is then severed from the spool and dropped onto the feeding bed in the correct position which it is to occupy in advancing to the welding structure.

Accordingly, the object of my invention is to produce an improved fabric welding machine in which the strands of the finished fabric are free from distortion; in which the strands of one set overlie the strands of another set, and in which all of the crossing points are fastened together without the formation of humps or other irregularities.

Other details and objects of the invention will be understood from a reading of the following specification in connection with the accompanying drawings, in which,—

Fig. 5 is a plan view of the wire cutting mechanism, together with the clamps and carrier release mechanism shown in the upper portion of Fig. 1;

Fig. 6 is a detailed perspective view of a carrier releasing latch employed in connection with the apparatus shown in Fig. 5;

Fig. 7 is a perspective view of the parts shown in Fig. 5, looking from the top of Fig. 5;

Fig. 8 is a side detailed view of the wire cutting mechanism shown in Figs. 5 and 7;

Fig. 9 is a side view of the assembled machine looking from the bottom of Fig. 1, certain of the parts being broken away;

Fig. 10 is a perspective view of a portion of the feeding bed structure of Fig. 9, illustrating the eccentric means employed for reciprocating the bars of the feeding bed;

Fig. 11 is a side view of a portion of the assembled machine looking toward the end of the welding roll at the top of Fig. 1;

Fig. 12 is a fragmentary view showing the operating connections for the feeding bed and the wire cutting mechanism at the top of Fig. 1;

Fig. 15 is an elevation of the welding roll, the welding bar and the welding electrodes, together with the actuating mechanism therefor;

Fig. 16 is a fragmentary detailed view of the welding roll structure with parts broken away to show the contact construction;

Fig. 17 is a section on line 17—17 of Fig. 15;

Fig. 18 is a rear end view (looking from the left in Fig. 1) of the driven end of the welding roll showing the clutch in its engaging position;

Fig. 19 is an enlarged perspective view of the clutch mechanism; and

Figure 1:
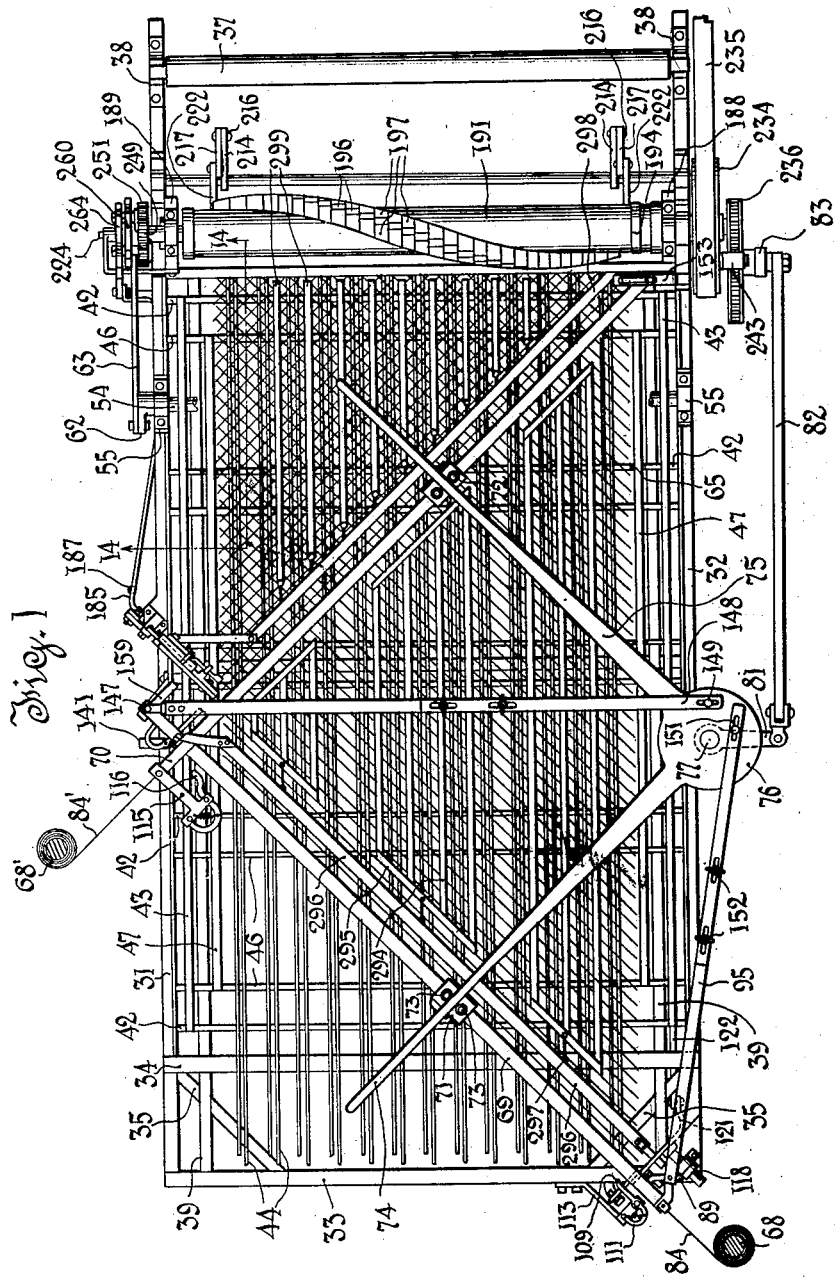
Fig. 1 is a top plan view of the entire machine, showing the mechanism for laying the wire strands on the feeding bed and the relation between the feeding bed and the welding structure.

The machine illustrated in the drawings comprises a welding mechanism, a reciprocating feeding bed for carrying the fabric to the welding mechanism, and mechanism for laying sets of wire strands in crossed relation on the feeding bed. In describing the structure and operation of the machine, the feeding bed structure and the mechanism for laying the wire strands on it will first be described, and then the structure of the welding mechanism will be set forth in detail.

Referring first to Fig. 1, the reference characters 31 and 32 designate side frame members of the machine connected together at the rear by an end frame member 33 and a tie piece 34. The rear end of the frame is also reinforced by suitable means, such as diagonal tie pieces 35. The front end of the machine is secured together by a cross bar 36 (see Fig. 14), and also carries a take-up roll 37 in suitable bearings 38. As here shown, the frame also includes longitudinal bars 39 connecting the end frame member 33 with the forward portions of the machine, and placed in spaced relation to the side frame members 31 and 32. The frame structure, as a whole, is supported on legs 41 secured to the side frame members adjacent their ends.

The side frame members 31 and 32 carry a welding roll structure near the forward end, and a take-up roll 37 supported in suitable bearings 38. The welding roll structure will be described subsequently.

Figure 13:
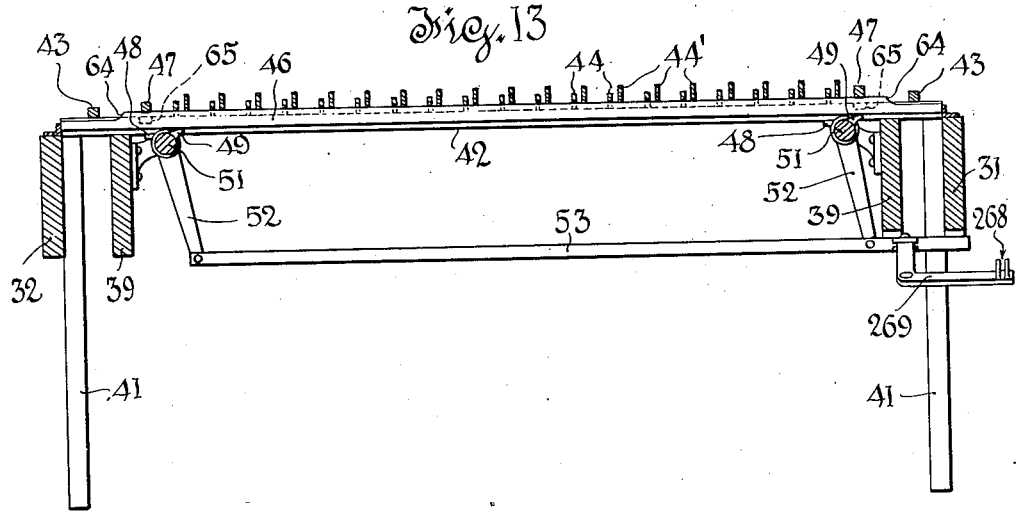
Fig. 13 is a transverse section on the line 13—13 of Fig. 14.

The feeding bed structure is shown best in Figs. 1, 2, 9, 10, 11, 13 and 14. Referring particularly to Figs. 10 and 13, the reference character 42 designates one of a plurality of transverse feeding bar supports held in spaced relation and secured together by longitudinal tie members 43. The supports 42 in conjunction with the two tie members 43 which they carry, form a lattice-like structure for the purpose of carrying one set of notched wire feeding bars. These bars, designated 44, are secured to each of the transverse members 42 rigidly, so that the frame as it is raised or lowered, or advanced or retracted, carries the feeding bars with it. The feeding bars 44 contain notches 45 in their upper surfaces, the notches being so spaced as to form teeth having a length substantially equal to that of the mesh diagonal of the finished fabric to be made on the machine. It will be obvious that the feeding bars may carry any suitable form of projections in place of the notches shown.

Also disposed on the frame of the machine is a second wire feeding bar frame made up of transverse supports 46 in staggered relation to the supports 42 and tied together by tie bars 47. The supports 46 carry a set of notched bars 44', similar to the notched bars 44 but in staggered relation with respect thereto.

As best shown in Fig. 10, the supports 42 and 46 rest upon lugs 48 and 49, respectively, of oscillatable supporting bars 51 extending longitudinally of the machine and being capable of partial rotation through the actuation of levers 52 tied together by a link 53. (See Fig. 13.) The lugs 48 and 49 are disposed in angular relation so that when lug 48 is in a substantially horizontal position, the lug 49 is swung upwardly a short distance. In similar manner, when the bar is rotated to lower the lug 49, the lug 48 is raised.

Figure 14:
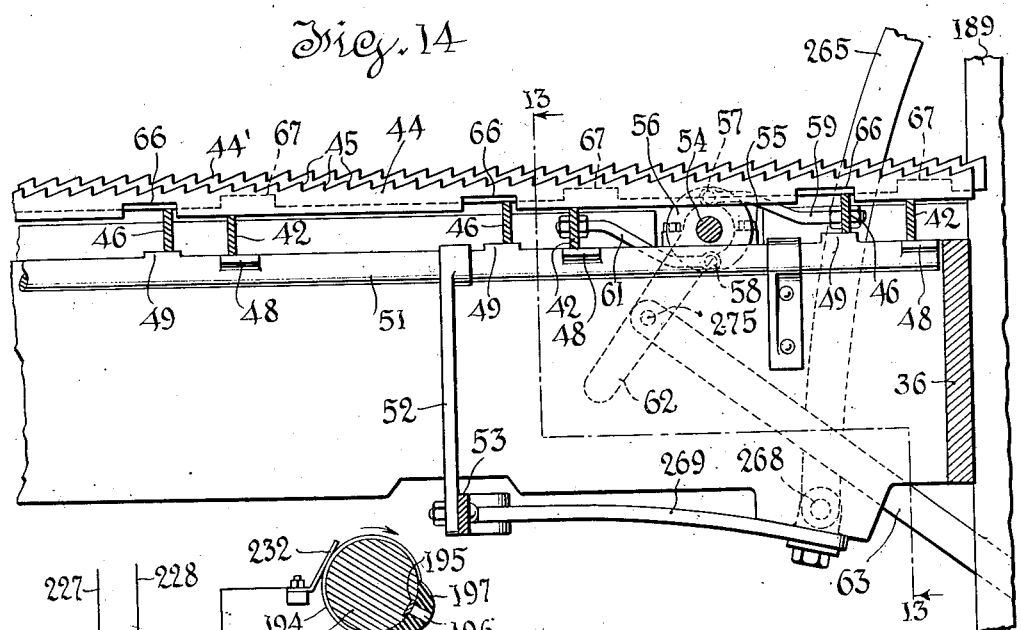
Fig. 14 is a fragmentary section on the line 14—14 of Fig. 1.

It will be clear from this that with the parts in the positions shown in Fig. 10, in which the lugs 48 are substantially horizontal, the frame composed of supports 46 carrying the feeding bars 44' is raised above the corresponding supports 42 and feeding bars 44. This is best shown in Figs. 13 and 14. When lugs 48 are raised and lugs 49 are lowered, the notched bars 44 are raised above the bars 44'. It will be understood that when one set of notched bars is raised the other set is lowered, and that when a set of these bars is raised, they must also be moved forwardly so as to advance the wire strands toward the welding mechanism.

Accordingly, the side frame members 31 and 32 carry an oscillatable shaft 54 mounted in bearings 55 and carrying rigidly secured thereto, an eccentric disc 56. This disc carries two pivot pins 57 and 58 to which are secured actuating rods 59 and 61. Rod 59 connects pivot pin 57 with one of the supports 46, so that rotation of eccentric disc 56 results in reciprocatory movement of the feeding bed support carrying notched bars 44'.

In similar manner, actuating rod 61 is connected to eccentric pin 58 in disc 56 and also to one of the transverse supports 42. The timing arrangement is such that the uppermost set of notched bars is always advanced by the eccentric mechanism at the same time that the lowermost set is retracted. Actuation of the shaft 54 is brought about through a lever 62 connected through a link 63 with actuating mechanism later to be described.

It will be understood that during normal operation of the machine the sets of feeding bars are alternately raised and lowered and that each set after being raised into contact with the wire strands, is advanced while the other set which is lowered out of contact with the strands is retracted. Because of this raising and lowering, it is necessary to provide clearance between the parts of the two rack-carrying frames. Accordingly, transverse supports 46 are cut away at their ends, as at 64, so that they may be raised without striking against the ties 43.

In similar manner, certain of the transverse supports 42 contain notches 65 so that these supports may be raised without striking against the ties 47. Provision must also be made in connection with the notched bars for preventing them from being raised inopportunely. Consequently, bars 44 contain notches 66 in alignment with the supports 46 so that elevation of the supports 46 does not bring these supports into contact with bars 44 at all. In similar manner, the bars 44' contain notches 67 in alignment with supports 42 so that when these supports are raised they will not engage bars 44'.

Means are provided for withdrawing wires from spools 68 and 68', carrying them across the feeding bed, stretching them, and then severing them from the main coil prior to their being dropped onto the notched bars. Generally stated, this mechanism comprises two guides 69 and 70, disposed substantially at right angles to each other and extending across the frame of the machine above the feeding bed. Slidable on these guides are wire carriers 71 and 72 adapted to seize wires from the spools 68 and 68', respectively. At the end of their travel these carriers release the wires and drop them onto the feeding bed after a stretching operation and a severing of the wire.

The mechanisms associated with the two guides 69 and 70 are similar except where structural details of the machine require a rearrangement of parts. Consequently, a description of the mechanism associated with the spool 68 will be given, and then the differences between this structure and that used in connection with spool 68' will be pointed out in detail.

Prior to describing this mechanism, it should be stated that the carriers 71 and 72 each carry two pins 73 embracing lever arms 74 and 75. These arms 74 and 75 are secured to a member 76 and are displaced substantially 90° from one another.

The member 76 (see Fig. 9) is rigidly secured to a vertical shaft 77 rotatable in bearings 78 and 79 through a lever 81 and a link 82 connected with the driving mechanism of the machine through an arm 83. It will be understood that the operation of this mechanism is such as to swing the member 76 from a position in which carrier 71 is in its extreme left hand position of travel, to one in which it is at its right hand position of travel adjacent to the mechanism associated with spool 68'. The movement of member 76 is, therefore, oscillatory and causes reciprocating movement of the carriers 71 and 72 back and forth along their guides 69 and 70.

Figure 2:
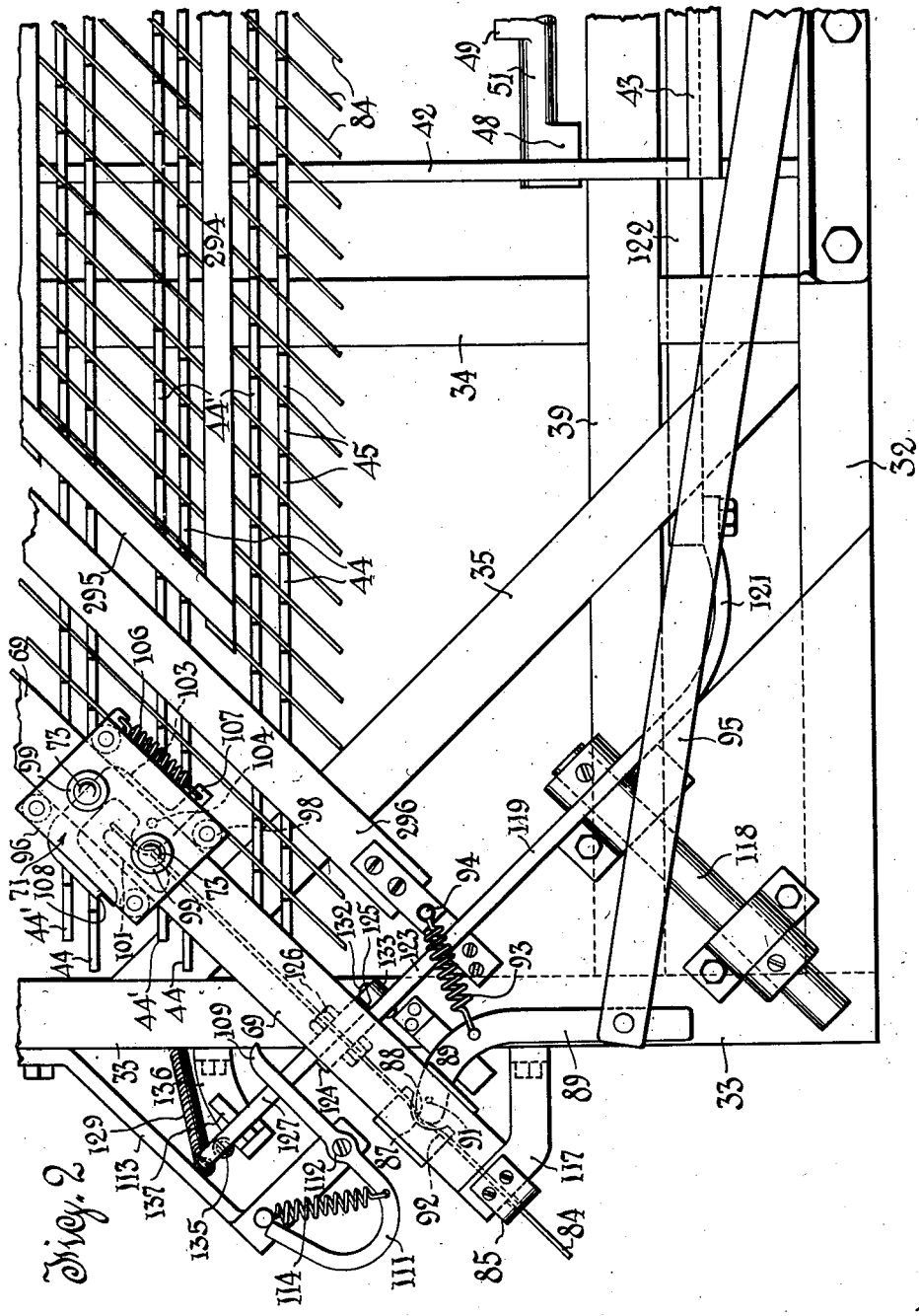
Fig. 2 is an enlarged plan view of the lower left hand corner of the machine shown in Fig. 1, illustrating a portion of the strand-positioning apparatus.
Figure 4:
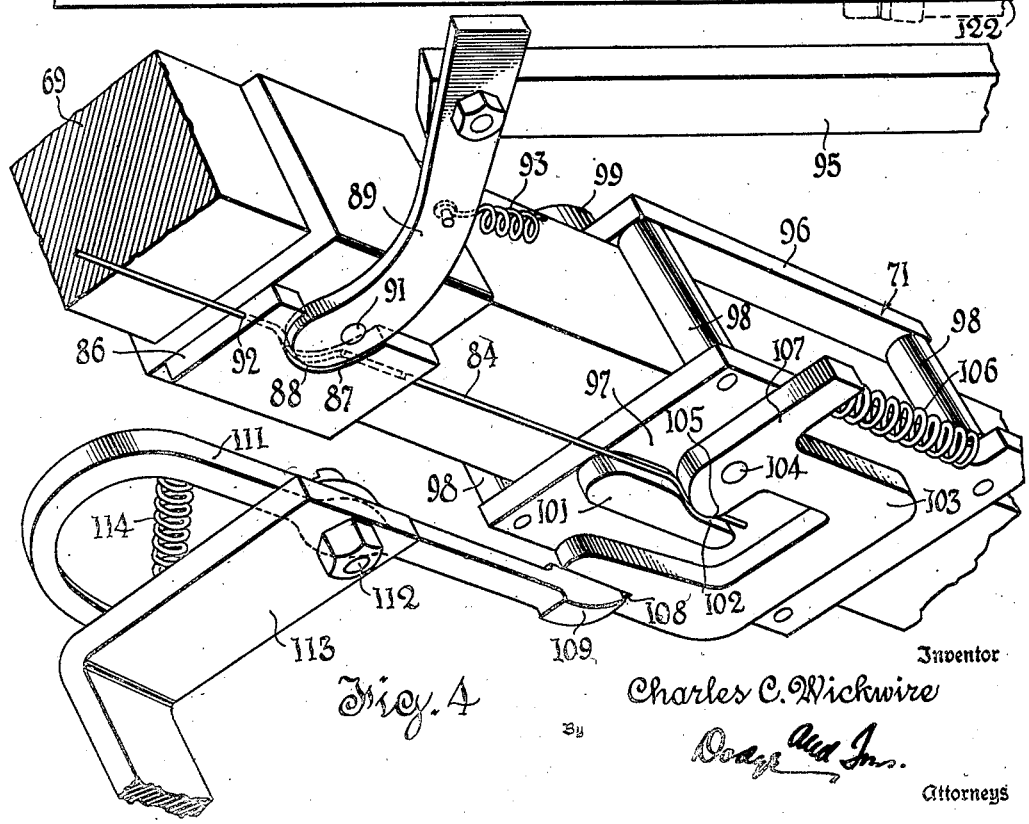
Fig. 4 is a bottom perspective view of the wire carrier shown in Fig. 2.

The wire 84 coming from spool 68, passes through an opening in a block 85 functioning as a wire guide and thence through a gripping device comprising a block 86 containing a curved recess 87 (see Figs. 2 and 4). Associated with the curved recess 87 is a curved end 88 of a lever 89 pivoted at point 91 and capable in one position of bringing the curved surface 88 into engagement with the recess 87 to form a wire clamp, but normally occupying a retracted position in which the wire 84 can pass freely through the space between the recess 87 and surface 88 after passing through an opening 92 in the block 86.

The gripping device is normally biased to its retracted position by a tension spring 93. As shown in Fig. 2, this spring is connected between the long end of the lever and a stationary abutment 94. Normally, the gripping device is released so as to permit the carrier 71 to pass along the guide 69 and withdraw wire from spool 68. The parts are so arranged, however, that when carrier 71 approaches the end of its travel a lever 95 is actuated to close the gripper and to prevent further withdrawal of wire from the spool. Consequently, during the further travel of carrier 71 the wire is stretched and therefore straightened before it is dropped onto the feeding bed. The effect of this stretching is to prevent buckling of the wires and other kinking which would result in an uneven fabric.

The wire carrier 71 comprises, as here shown, two plates 96 and 97 embracing the sides of guides 69 and connected by rods 98. The top plate 96 carries pins 73 which may be provided with suitable antifriction rollers 99 to improve the sliding action between the carrier and the arm 74. The bottom plate 97 carries wire gripping mechanism comprising a fixed block 101 having a curved gripping surface 102. Pivotally supported on the block 97 is a bent lever 103, pivoted at 104, and having a curved surface 105 adapted to cooperate with the curved surface 102 on block 101, and in one position to grip a wire between the surfaces 102 and 105.

A tension spring 106 is secured to block 97 and also to arm 107 of lever 103 so as to hold the gripping device closed at all times except when a notch 108 in bent lever 103 strikes an abutment 109 on end frame member 33. The abutment 109 is formed at one end of a pivoted lever 111, pivoted at 112 on a bracket 113 secured to frame member 33 and biased by spring 114 to a position in which it will be struck by notch 108. Spring 114 not only holds the abutment in a proper position to engage the notch 108 as the carrier reaches its left hand position of travel, but also renders this abutment resilient and cushions the shocks which it might otherwise receive when the carrier strikes it.

Mounted on the frame of the machine by means of a bracket 115 is a second abutment 116 adapted to strike the notch 108 in lever 103 when the carrier 71 reaches its extreme right hand position of travel. Consequently, it will be seen that at its left hand limit of travel, the wire-gripping device is released when notch 108 strikes abutment 109, although normally held in gripped position by spring 106. At its right hand position of travel, notch 108 engages abutment 116 so as to release the gripping device when it is desired to drop the wire onto the feeding bed.

Each time the carrier 71 reaches its extreme right hand position of travel and subsequent to the stretching of the wire, it is necessary that the wire be severed adjacent the gripping device 87, 88. For this purpose cutting mechanism in the form of shears is provided for operating automatically at the proper time.

Figure 3:
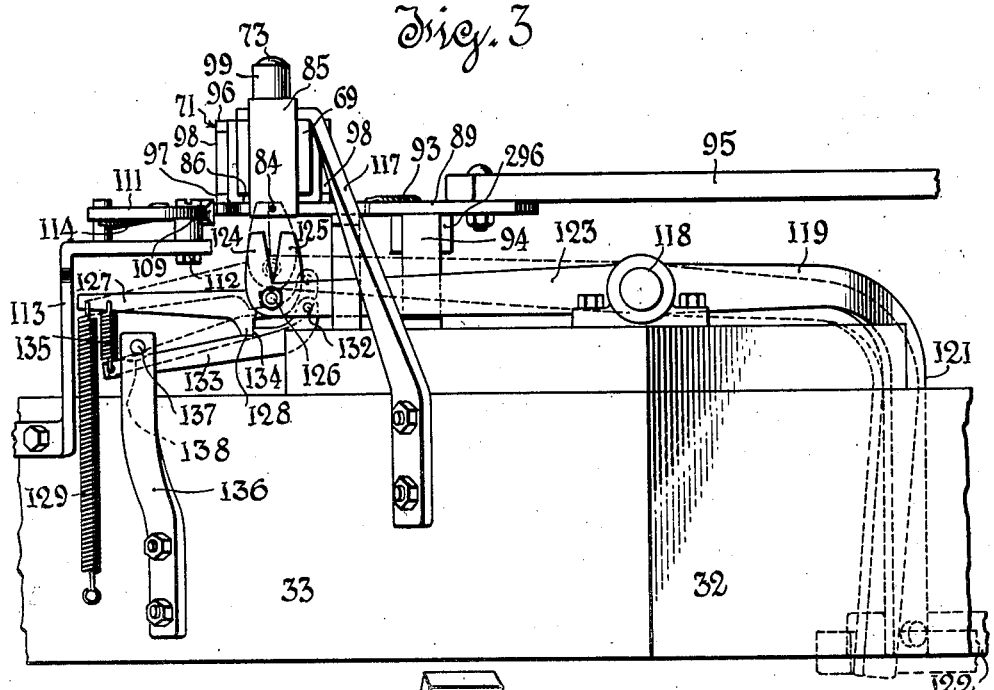
Fig. 3 is a side view of the apparatus shown in Fig. 2, illustrating the mechanism for severing the wire strands from the wire on the spool.

This cutting mechanism is clearly shown in Fig. 3, wherein the carrier guide is shown at 69 as being supported by the bracket 117 secured to the machine and having the wire guiding member 85 mounted on it. Pivoted on the frame of the machine at 118 is a curved lever 119 having a depending portion 121 adapted to be actuated through a rod 122. The other arm 123 of the lever terminates in an upstanding cutting blade 124, disposed below the wire 84 in front of the gripping device.

A second cutting blade 125 disposed adjacent to blade 124 is pivoted about arm 132 at 126 and carries an extension 127 having a depending abutment 128. The end of arm 127 remote from pivot 126 receives one end of a tension spring 129, the other end of which is secured to the end frame member 33. Pivoted at 132 in arm 123 adjacent to the pivot point 126, is an arm 133 having a notch 134 adapted to cooperate with and receive depending abutment 128 on arm 127.

When the shears are in their lowered position, the abutment 128 and notch 134 are held in the position shown by a tension spring 135 which is connected between the arms 127 and 133. The end frame member 33 also carries a bracket 136 having a stop pin 137 near its top end and disposed in the path of arm 133. Arm 133 contains a notch 138 which is adapted, during upward movement of arm 133, to cooperate with the pin 137 to release the cutting mechanism and to cause severance of the wire through the action of spring 129 whenever rod 122 is moved to the left, as shown in Fig. 3, and blade 124 is lifted together with arm 133.

The engagement of abutment 128 and notch 134 causes the blades 124 and 125 to be held in open spaced relation, as shown in full lines. Upon continued upward movement of the blades, they reach a position in which they extend above the wire 84, at which time notch 138 in arm 133 strikes pin 137. Continued upward movement of the blades causes disengagement of abutment 128 and notch 134, so that blades 124 and 125 are brought together suddenly and sharply by the action of spring 129, thereby severing the wire. After the cutting operation, a movement of rod 122 in the right hand direction restores the parts to the position shown in the drawing, under actuation of springs 129 and 135.

The carrier 72 is mounted to slide on the guide 70. Inasmuch as this carrier is identical in structure with carrier 71, further description of this element will not be necessary.

Carrier 72 is moved along the guide 70 by arm 75 and is limited in its movement to the left, (see Fig. 5), by engagement with a resilient stop 139 similar to stops 109 and 116, previously described, and carried on a bracket 141 on side frame 31. The wire 84' coming from spool 68' passes along the under side of guide 70 until it reaches a gripping device similar to the one associated with spool 68. This gripping device comprises a block 142 containing a recess 143, with which cooperates a curved end 144 on lever 145, pivoted at 146 on guide 70.

When the carrier 72 is moving away from the gripping device, the device is released but the parts must be so arranged as to grip the wire when the carrier is near the end of its travel and it is desired to stretch the wire. Accordingly, there is connected to the end of lever 145 at 147, an adjustable tie rod 148 connected to head 76 at 149 by means of a pin and slot connection. The pivot point 147 carries considerable weight because of the length of tie rod 148. Consequently, I provide a supporting and guiding means for these parts in the form of a curved bracket 158, secured to side frame 31 and having a horizontal arm 159 along which the arm 145 can slide.

As the head 76 moves to the right to advance the carriers 71 and 72 along their guides, the gripping device is held in released position, but when such carriers approach the end of their travel the tie rod 148 is placed under tension, thereby swinging arm 145 about its pivot and gripping the wire between the recess 143 and the curved end 144 of this arm to prevent withdrawal of more wire from the spool 68'.

Further movement of the carrier 72, therefore, results in an elongation of the wire. Simultaneously with the operation of this gripping device, the gripping device associated with spool 68 is operated by tie rod 95, which is also connected to head 76 by a pin and slot connection at 151. Both the rods 95 and 148 are adjustable to proper timing by bolts and slots 152. Accordingly, when head 76 is rotated in a counterclockwise direction to return the carriers 71 and 72 to their starting stations, the rods 148 and 95 are actuated to release the wire-gripping devices associated with spools 68' and 68, respectively, and these gripping devices remain released until the position of head 76 is such as to place the tie rods under stress again.

The carrier 71 releases its hold upon the wire 84 through the action of resilient stop 116. The structure of guide 70 being different, a different type of stop is necessary for releasing the wire. This stop is shown in detail in Fig. 6. Briefly, it comprises an angular supporting bracket 153 secured to the side frame 32 and having a pin 154 projecting downwardly through it, the lower end of this pin being rounded at 155, while the top end carries a head 156 to prevent the pin from passing through the end of the bracket. The horizontal portion of the bracket carries a leaf spring 157, which permits upward movement of the pin but biases it in a downward direction.

In describing the operation of the stop, reference should be had to Fig. 4 of the drawings, wherein the carrier structure is shown in detail. This stop is disposed above the guide 70 in a position such that when the carrier 72 approaches it, the top of lever 103 ahead of notch 108 will strike the rounded end 155 of pin 154. The pin will, accordingly, be raised against spring 157 and will ride over the surface of the lever 103 until it drops in the notch 108, when it will be forced downwardly by the action of spring 157 to thereby restrict retrograde movement of the carrier 72. The parts are so adjusted that at this time, the wire strand 84' has been elongated sufficiently and has been cut so that it is ready to be dropped and the carrier allowed to return.

Accordingly, as arm 75 starts to swing away from this stop, the notch 108 engages the pin 154 thereby swinging the arm 103 about the pivot 104 and releasing the gripping device against the action of tension spring 106, which normally holds the device in closed position. This rotation may continue far enough to allow the pin to ride out of the notch, whereupon the carrier will be free to return to its starting position and spring 106 will become effective again to close the jaws, which, however, at this time contain no wire.

It will be understood that at the time the gripping device is released, it is necessary to sever the wire 84' in front of the gripping device at the starting position, and this is accomplished by a cutting mechanism functioning similarly to the cutting device located adjacent spool 68 but differently disposed. This cutting device, shown in detail in Figs. 5, 7 and 8, will now be described.

Referring first to Fig. 7, the reference character 161 designates a suitable supporting bracket secured to the side frame 31 and containing two guides 162 and 165, in which is mounted for sliding movement, a bar 163 terminating at its forward end in a cutting blade 164. Pivoted to bar 163 at 166 is a bar 167 terminating in a cutting blade 168, in cooperative relation with blade 164. The body of bar 167 carries an upstanding bracket 169 having a coil tension spring 171 secured to its outer end, and also to the bracket 161 at point 172. The bar 167 contains a notch 173 which, in the retracted position of the cutting device, abuts the top end of guide 165 to hold the cutting device in open position.

The bar 163, slightly in rear of pivot point 166, carries an enlargement 174 for the reception of a laterally movable guide pin 175 cooperating with a slot 176 in bar 167. The end of pin 175 remote from bar 167, carries a depending pin 177 for cooperation with a cam surface 178 on the forward end of bracket 161. A coil spring 179 is secured to the top end of pin 177, and is anchored at its other end to a pin 181 secured to bar 163. (See Fig. 5.) With the parts in the position shown in Fig. 7, the pin 177 is on the low point of cam 178 and pin 175 is projected to the right through the slot 176, thereby holding the blades 164 and 168 in open position.

The bar 167 is capable of reciprocatory movement in guides 162 and 165 through the action of a bell crank lever 182, pivoted at 183 on the side frame 31 of the machine. When the top arm of bell crank 182 is moved to the right, in Fig. 7, the bar 163 is projected forward carrying the blades 164 and 168 with it and moving notch 173 out of engagement with the top of guide 165. As this movement continues, the pin 175 holds the blades open until they embrace the wire 84', whereupon pin 177 strikes the cam surface 178 so as to retract pin 175 against the action of spring 179, and to allow the blades to be thrown together quickly and sharply by the tension of spring 171, thus severing the wire. After the cutting operation, the bell crank 182 is swung to the left again, thereby withdrawing bar 163 and returning pin 177 to the low point of cam 178.

The pin cannot enter the slot 176 at this time because the body portion of bar 167 covers the opening in bar 163. Upon further movement of the parts, the bar 167 rides onto the top of guide 165, thereby lifting bar 167 and when notch 173 engages the top of guide 165, the opening in bar 163 is uncovered so that spring 179 acts to force the pin 175 into the slot 176 again to hold the blades 164 and 168 in open position.

Actuation of the bell crank lever 182 about pivot 183 is brought about through a link 184, the pivoted lever 185 (see Fig. 12), and the cam mechanism for rocking this lever about its pivot 186. The bell crank lever 182 and its associated parts are biased to the position shown in Fig. 7, by a spring 187 connected to the end of lever 185 near its junction with link 184.

The cutting device occupies the position shown in Fig. 5 while the carrier is returning to its starting position and advancing again to a point near the end of its travel. It will now be understood that the carriers 71 and 72 move forward together to carry wires across the feeding bed of the machine; that these wires are severed from the spools simultaneously, and then cut and released so that the strands fall onto the feeding bed of the machine, where they are engaged by the teeth in the feeding bars and are fed forwardly to the welding mechanism. The spacing of these teeth is such as to maintain a proper spacing between the various strands and to insure the production of a fabric having mesh of uniform predetermined size and shape.

Inasmuch as the carrier 71 operates to the rear of carrier 72, the strands 84 will form the bottom layer and will all remain in the bottom plane of the fabric; while the strands 84' are placed in crossed relation to the strands 84 and on top of them, all of the strands 84' being in the top plane of the fabric. When the strands are laid on in this way, the intersections of the strands occur in front of the teeth of the notched bars, so that the tractive effort exerted by these bars is always applied at points where the wires cross so as to maintain proper spacing of the strands and to prevent them from being bent or distorted.

Having described the feeding bed and the mechanism for laying wire strands on it in crossed relation, the mechanism for welding the joints will now be described. The structure of the welding mechanism is generally similar to that disclosed and claimed broadly in my copending application, Ser. No. 486,467, filed October 4, 1930, with the exception that the welding roll has been raised and the electrodes operated by it made longer, so as to space the welding roll by a substantial distance from the feeding bed of the machine.

Referring now to Figs. 15 to 17, the reference characters 188 and 189 designate uprights secured to the side frame members 31 and 32 of the machine frame proper, and carrying a rotatable welding roll 191 disposed on top of them and carried in bearings 192. This roll performs the function of supplying current to the welding electrodes progressively, and moving such electrodes into contact with the wire joints and forcing such joints against a bottom welding bar 193 extending transversely of the machine bed.

The welding roll 191 is of cylindrical cross section and composed of insulating material. Near one end it carries a slip ring 194 connected to a bus bar 195 extending serially around the roll and ending at a point diametrically opposed to the point at which it is connected to the slip ring. This bus bar is of electrically conducting material, such as copper, and carries at spaced points along its extent, a series of contactor bosses 196. These bosses are of the same height and each one is confined between two cam-like blocks 197 of insulating material. The bosses are of substantial peripheral extent, and are so spaced as to overlap so that during the welding operation contact is never broken with one of these bosses before it is made with the succeeding one. In this way, sparking and pitting of the contacts is avoided, and surging of the current in the welding circuit is reduced to a minimum. The blocks 197 serve as guiding cams cooperating with the ends of electrode bars 198.

The structure of the electrode bars will now be described in detail, reference being had particularly to Fig. 17, in which the structural details are clearly shown. Extending laterally between the uprights 188 and 189 are two spaced perforated supports 199 and 201, preferably of insulating material. These uprights are also connected just above the welding bar 193 by a laterally movable bar 202 adapted to support the bottom ends of electrode bars 198.

The electrode bars 198 extend through perforations in the supports 199 and 201, and preferably carry pins 203 to limit their upward movement. They also carry coil springs 204 pinned to them at 205 and held between collars 206. The springs 204 are under slight compression and support the entire weight of the electrode bars, but permit their downward movement when they are contacted by the cam-like blocks 197 and the contactor bosses 196. Each electrode bar is made up of a top section and a bottom section connected together by spring members 207, so as to allow upward movement of the bar when the electrode is brought into contact with the fabric and the welding bar 193, to compensate for any unevenness or variations in the surface to be welded.

The bottom ends of bars 198 pass through openings in support 202 and are capable of downward movement far enough to bring them into engagement with the welding bar 193, disposed directly beneath them. By reference to Fig. 1 of the drawings, it will be noted that successive rows of joints to be welded, extending transversely of the machine bed, are staggered through a distance equal to one-half of the transverse diagonal of the fabric mesh. Consequently, it is necessary to shift the electrodes between the making of successive rows of welds. This is taken care of by mounting the support 202 for lateral sliding movement through the uprights 188 and 189 and providing cam mechanism for oscillating this support in proper sequence with the operation of the welding mechanism.

It will be understood that as the welding roll 191 rotates, the electrodes are forced downwardly in succession, starting at one side of the frame and proceeding across it until a complete row of welds is made during one complete rotation of the welding roll. The feeding bed structure then operates to move the fabric forward a distance equal to one-half of the mesh diagonal, taken longitudinally of the machine, and then the support 202 is moved laterally to bring the electrodes into registry with the next row of joints to be welded.

Mounted in front of the electrodes and capable of pivotal movement about point 207, is a bar 208 adapted to rest on top of the fabric and to hold it down against the welding bar 193, and to prevent it from catching in the depending ends of the electrodes. The electrodes in their elevated positions, are raised sufficiently so that their bottom ends are above the bottom surface of bar 208. As the fabric leaves the welding bar, it passes over a series of toothed wheels 209 rotatably mounted on shaft 211 extending transversely of the machine and secured to the side frames 31 and 32.

Mounted above the toothed wheels 209 is a bar 212 containing recesses 213 for the accommodation of the wheels 209. The purpose of this bar is to make it impossible for the finished fabric to pass from the machine without engaging the teeth of wheels 209, which teeth enter the meshes of the fabric and keep it properly lined up longitudinally of the machine.

The wire carrier mechanism elongates the wire strands before placing them on the feeding bed and severing them from the wire on the spools. The strands are lined up accurately with the teeth of the notched feeding bars but certain irregularities are bound to occur and there is some jarring action during the travel of the strands along the bed. Consequently, means are provided to rest on top of the wire strands and to hold them into intimate contact with the bed, and yet not to interfere with their free forward travel.

The general arrangement of this holding means will be apparent from an inspection of Fig. 1. This means comprises a series of light frames composed of spaced parallel longitudinal members 294 connected together by end members 295. The members 294 are of varying length so that the frames can rest in the space between guides 69 and 70 without interfering with any of the moving parts. As shown in the drawings, the space between guides 69 and 70 contains three of these frames of varying length and having oblique ends.

Secured to the side frames of the machine and extending diagonally across it in parallel relation to the guide 69, is a bar 296 to which the various frames are secured loosely by flexible ties secured to the midportion of end members 295 and pivoted to the bar 296, as at 297. The longitudinal members 294 are spaced so that they rest on the wire strands between adjacent notched bars so as not to interfere with the action of these bars in feeding the strands. The forward ends of the frames float freely, and the motion of the bed is relied upon to keep the frames in proper alignment.

The space in front of guide 70 also contains holding means but of a different character from that employed between the guides. In this case, a bar 298 extends across the bed substantially parallel to guide 70, and is secured by suitable brackets to the side frames of the machine. Secured to bar 298 at spaced intervals between the notched bars of the bed are rods or slats 299, free at their forward ends but pivotally connected to the bar 298 at 301 by flexible connectors 302. These members 299 are of such weight as to maintain the crossed wires in proper contact relation without bending or distorting them.

Although the strands of wire laid on the feeding bed are of substantially the same length, some variations in the edges of the fabric are bound to occur, and for this reason I find it preferable to provide means for trimming the edges of the fabric as it emerges from the welding mechanism. The trimming mechanism is shown in Figs. 11, 15 and 17. It comprises two pairs of shears, one disposed on each side of the machine in front of the welding mechanism and operated by the rotation of the welding roll 191.

Each pair of shears comprises a stationary cutting blade 214 secured to the machine frame at 215 and having pivoted to it at 216, a swingable cutting blade 217. Blade 217 is biased to elevated position remote from blade 214 by a tension spring 218 connected to it, and to a stationary abutment 219 secured to one of the frame uprights. Pivoted to blade 217 at 221 is an actuating rod 222 having a reversely bent upper portion (see Fig. 9), extending through an opening in support 199 and terminating in an end 223 cooperating with a cam 224 on welding roll 191. The welding roll carries two of these cams, and the shears at either end of the frame are of identical construction, consequently a description of one of them will suffice.

As the welding roll 191 rotates, the rod 222 will be forced downwardly through support 199 and guide 225 in bracket 226, so as to move blade 217 downwardly into cutting relation with the fabric and with the stationary blade 214. The two pairs of shears are operated simultaneously and intermittently to cut off the sides of the fabric and they may be timed to operate any time during the welding operation. It is, however, essential that they be released when the fabric is fed forward, otherwise the particular time at which they operate is immaterial. Since they are timed to operate once during each revolution of the welding roll, a complete trimming of the fabric by successive steps is certain to result.

Figure 20:
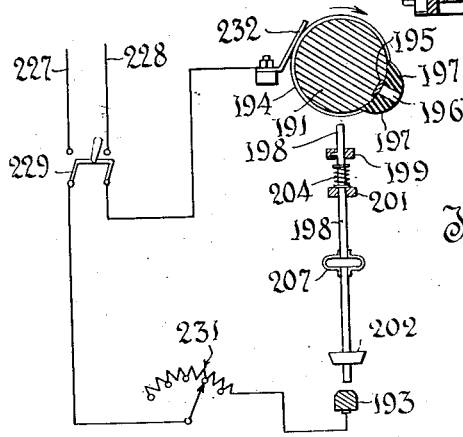
Fig. 20 is a diagrammatic view of a welding circuit taken through one of the welding roll contacts and associated electrode.

Before describing the actuating mechanism of the machine, reference may be had to the diagrammatic view of Fig. 20, wherein the welding circuit is illustrated. It will be understood that the wires 227 and 228 are connected to any suitable source of welding current which may be supplied to the welding mechanism by closing switch 229. Wire 227 is connected through switch 229 and adjustable resistance 231 to the welding bar 193. Wire 228 is connected through switch 229 to a brush 232 bearing on slip ring 194, and this ring in turn forms an electrical connection with bus bar 195 and contacts 196.

When switch 229 is closed, the circuit is completed from the source each time that welding roll 191 brings one of the contact bosses 196 into contact with electrode bar 198, so as to bring the bottom end of this bar into contact with the fabric and the welding bar 193. As previously stated, the arrangement of contact bosses 196 is such as to maintain this welding circuit closed during a complete revolution of the welding roll 191, because each contact boss 196 is kept in contact with its associated electrode bar until the following boss forms an electrical connection with its electrode bar. This arrangement not only eliminates arcing of the contacts, but it insures a uniform current concentration for each weld, thereby requiring less current and producing a more perfect connection than can be obtained when a whole row of welds is made simultaneously, and the variation in contact resistance of the joints can cause variations in the welding current supplied to them.

Having described the feeding bed, the mechanism for laying wires on the bed, and the welding mechanism, the means whereby all of the parts are actuated in proper and timed sequence will now be pointed out in detail, reference being had to Fig. 15 first.

The projecting end of shaft 233 on which welding roll 191 is mounted, carries a pulley 234 which may be connected with any suitable source of power by a belt 235. (See Figs. 9 and 17.) The shaft 233 also carries adjacent to pulley 234 a sprocket 236, connected by a chain 237 with a second sprocket 238 carried on shaft 239 extending transversely of the machine, and secured to the inside of the front legs of the machine. The side frame 32 carries a chain-tightening device comprising an adjustable arm 241, pivoted at 242 and carrying a roller 243 which engages the chain. The end of shaft 239 projecting beyond sprocket 238, has keyed to it the arm 83 which operates through rod 82 and the associated mechanism to swing the head 76 and the arms connected to it, to thereby actuate the wire carriers 71 and 72. Each time that the shaft rotates, the arms 74 and 75 will be given one complete oscillation between their starting points to the end of their travel, and back again to their starting points.

The shaft 239 also carries two cams 244 and 245 on opposite sides of the machine. Cam 244 cooperates with the end of rod 122 slidable in a support 246 secured to side frame 32, to operate the wire-cutting mechanism associated with spool 68. Once during each rotation of the shaft 239, rod 122 is pushed to the left, in Fig. 9, to operate the cutting mechanism and then returns by the action of spring 129 (see Fig. 3), which lowers the cutting mechanism after its actuation.

The cam 245 on the other side of the machine, cooperates with an arm 247 of lever 185 to operate the cutting mechanism associated with spool 68', once during each revolution of shaft 239. As soon as the cam releases the arm 247, the parts are returned to the position shown in Fig. 12 by spring 187, the free end of arm 247 being guided in its movement by a guide 248, which maintains it in alignment with cam 245.

The other extended end of shaft 233 carries a gear 249 rigidly secured to it and meshing with a larger gear 251, carried on a shaft 252 secured in the upright 189 of the machine frame. The gear 251 carries on its opposite faces two cams 253 and 254, each of less than 180° in extent and in symmetrical diametric relation to the axis of the gear. These cams cooperate with rollers 255 and 256 carried on one end of an oscillatable lever 257, pivoted at 258 in a bracket 259 secured to upright 189. The lower end of lever 257 is held between two fixed abutments 261 on support 202, so that as the lever oscillates it moves the support 202 from one to the other of two laterally displaced positions.

The operation of this mechanism is such that as the gear 251 rotates the rollers 255 and 256 are shifted so as to oscillate lever 257. For example, in the position shown in Fig. 15, roller 256 is about to engage the cam 253, to swing the roller 256 to the right and thereby move the support 202 to the left. After approximately 180° of rotation of gear 251, the roller 256 reaches the end of cam 253 and roller 255 engages the cam 254 to return the parts to the position in which they are shown. The position of the cams on gear 251 is so chosen that the shifting operation occurs at the proper time in the welding sequence and insures a completion of one row of welds before the electrodes are shifted in position above the succeeding row of joints to be welded.

The gear 251 in addition to controlling the position of the electrodes, also carries mechanism for actuating the feeding bed, both to raise and lower the feeding bars and to reciprocate them in proper sequence. For this purpose, the face of gear 251 carries four studs 262 (see Fig. 11), on which are mounted in diametrically opposed relation and separated by collars 263, a pair of cams 264 and 260.

Cam 264 is of substantially 180° in extent and cooperates with a forked lever 265 pivoted at 266 on a bracket 267 carried by upright 189. The lever 265 has a depending portion pivotally connected at 268 with a curved link 269 and forming a driving connection through tie rod 53 and levers 52 with the oscillatable supporting bars 51 of the feeding bed. The lever 265 carries at its upper end two extensions 268 and 269, terminating in teeth 271 and 272.

When the cam engages tooth 272, as shown in Fig. 11, the lower end of lever 265 is swung to the left, and when tooth 271 engages this cam, the lower end of lever 265 is swung to the right. This movement of lever 265 results in oscillation of the supporting bars 51 to reverse the positions of sets of feeding bars 44 and 44'.

The cam 260 is diametrically related to cam 264 and functions to move the uppermost set of feeding bars forward, and at the same time, to move the lower set backward. For this purpose, this cam has cooperating with it a forked lever 273 pivoted at 266 and similar in construction to the lever 265, just described.

Lever 273 carries at its lower end one end of a link 63, pivotally connected to arm 62 at 275, the arm 62 being capable of rotation through a small angle sufficient to advance the uppermost set of feeding bars through a distance equal to one-half of the length of a mesh diagonal. The upper end of lever 273 has two arms 276 and 277 carrying teeth 278 and 279, respectively, cooperating with cam 260. When the tooth 278 is in engagement with cam 260, the lever 273 is swung to the right to rotate eccentric disc 56, and to move the set of feeding bars 44' forward, and move the bars 44 backward. In similar manner, when tooth 279 engages cam 260 the lever 273 is swung to the left to move the set of notched bars 44 forward, and the set of bars 44' backward.

The cam mechanism, particularly the outer cam 264 carried by gear 251, is centered and guided by an extension 274 in its outer face having a bearing in an extension 281 on bracket 259.

The entire actuation of the machine is accomplished through the shaft 233 carrying welding roll 191. The pulley 234 can be engaged and disengaged from the shaft 233 by a clutch mechanism best shown in Figs. 18 and 19. The pulley 234 has a hub portion 282 containing a lateral slot 283 in its inside end and adapted in one position to receive a plunger 284 having a curved surface 285. Fixed to the shaft 233 is a disc 286 containing a chamber 287 into which the plunger 284 is retractable. This chamber 287 contains a coil spring which tends to force the plunger 284 outwardly from it.

Pivotally mounted on the frame of the machine in a support 288 is a shaft 289 carrying a clutch-actuating bar 291. This bar has an inclined under surface 292 adapted to cooperate with the curved surface 285 on plunger 284. The shaft 289 also carries a handle 293 which can be rotated to bring the bar 291 into engagement with the hub 282, when it is desired to disengage the pulley from the disc 286 and thereby interrupt the driving of the machine.

It will be understood that as the pulley 234 rotates with the bar 291 in its retracted position, plunger 284 is forced into slot 283 so that disc 286 rotates in unison with the hub 282 and the machine is driven so long as this connection is maintained.

When it is desired to stop the machine, the bar 291 is brought into contact with hub 282 and as this hub rotates the plunger 284 strikes the inclined surface 292, thereby forcing this plunger out of the slot 283 and into the chamber 287, allowing the pulley to rotate freely and independently of the disc 286. When the bar 291 is left in engagement with this hub, the clutch remains disconnected until the bar is retracted.

The structural details of the machine having been described, the sequence of operation of the various parts as it occurs during the formation of the fabric will be set forth. In describing the operation, it will be assumed that pulley 234 is connected to a suitable source of power to set the shaft 233 in rotation and thereby to operate the carrier actuating arms 74 and 75 through gears 249 and 251, thus actuating the levers operatively associated with gear 251 and also to drive the shaft 239 through the chain and sprocket connections. It will also be assumed that the feeding bed carries a series of wire strands in the relation in which they are shown in Fig. 1, the arms 74 and 75 occupying the positions shown in the drawings.

One of the sets of notched bars on the feeding bed has just been advanced to bring a row of wire strands in position on welding bar 193, and the first contact boss on welding roll 191 is approaching one of the electrode bars 198 at the end of the machine adjacent to the upright 188. The support 202 at this time occupies a position wherein the electrodes will be in proper alignment with the row of fabric joints as they rest on the welding bar. One set of notched feeding bars will occupy its extreme forward elevated position, while the other set will occupy its extreme rearward lowered position.

The shaft 239, as it rotates, is swinging the arm 83 to return the carriers 71 and 72 to their starting positions, the gripping devices being closed by the springs 106. At this time, the gripping devices 87, 88, and 143, 144, are open, and the ends of wires 84 and 84' are protruding from these gripping devices ready to be seized by the gripping devices on the carriers when the carriers reach their fully retracted positions, where the gripping devices mounted on them are released by engagement with stops 109.

As the welding roll rotates, the bosses 196 are brought into contact with electrode bars 198 in succession, to complete a row of welds across the bed of the machine. At this time, the carriers 71 and 72 are returning to their starting positions, but no other movement is taking place in the machine.

When the carriers reach their starting positions and the gripping devices which they carry are released by stops 109, rod 82 is moved to the left, in Fig. 9, so that the ends of wires 84 and 84', occupying positions between the recess 102 in block 101 and the curved surface 105, are gripped through the action of spring 106 on arm 103 as soon as these blocks move away from their retracted positions far enough to disengage notches 108 from stops 109.

At this time, the cutting devices are at their fully retracted positions, and the gripping devices associated with the starting points on guides 69 and 70 exert no appreciable friction against withdrawal of the wire from spools 68 and 68'. As the arms 74 and 75 swing to the right, drawing carriers 71 and 72 with them, wire is withdrawn from the spools across the bed in parallel relation to the guides 69 and 70.

This movement continues until the carriers are near the end of their travel when rods 95 and 148 are actuated by rotation of member 76 to swing the arms 89 and 145 to grip the wires at the two starting stations. This prevents further withdrawal of wire from the spools, and results in elongation of the wire strands during the rest of the travel of the carriers.

Carrier 71 continues until it strikes and rides over stop 116. This does not result in a release of the gripping means until the carrier starts its return travel. When stop 116 registers with notch 108, rod 122 is moved to the left by cam 244, to bring the cutting means into operation and to sever the wire strand 84 from the wire carried by spool 68. At the same time, the gripping device on carrier 72 is released by pin 154 and the shears associated with the starting station of guide 70 are actuated by movement of arm 185 through cam 245.

When the strands are severed from the wire proper, the parts have reached a position in which arms 74 and 75 will start their return travel. The slightest movement of carriers 71 and 72 in a return direction, causes the gripping devices which they carry to be released, thereby dropping the strands 84 and 84' onto the feeding bed and permitting the carriers to return unencumbered to their starting positions, to grip the wire ends again.

The laying of the wire strands on the feeding bed takes place while the welding roll 191 is making a row of welds. When the roll completes its rotation and the last joint at the end of the roll adjacent upright 188 is welded, the mechanism for actuating the feeding bed is again brought into operation to lower the forward set of feeding bars and elevate the rear set, and to thereby move the fabric forward a distance equal to one-half the length of a mesh diagonal, through rotation of eccentric disc 56 actuated through shaft 54 and the linkage connected with cam 260.

It will be understood that previous to the actuation of shaft 54 in this manner, cam 264 has operated upon the linkage connection to rotate the supporting bars 51 in lowering one set of feeding bars and elevating the other. As the mechanism continues to operate in this manner, a completed fabric emerges from the front of the welding roll under bar 212, while the trimming devices at the edges of the fabric produce a smooth edge.

The fabric continues to be pushed forward until it reaches the take-up roll 37, where it may be wound up by any suitable take-up actuating mechanism. The formation of fabric will be accomplished automatically without any action on the part of an operator, so long as the spools 68 and 68' carry wire which can be laid across the feeding bed by the wire carriers and fed forward by the bed to the welding mechanism. It is essential, of course, that the parts be so timed that the feeding bed does not move while the welding operation is being carried out, nor does it move at the time when the carriers release the wire strands onto it.

So far as I am aware, I am the first in the art to employ an interdigital feeding bed in connection with automatic strand forming and laying mechanism. While continuously rotating conveyors have been used to lay crossed strands of heavy wire fabrics, fine wire fabric has never been made by means such as are here disclosed. This type of machine possesses numerous advantages and results in a high grade uniform product, which is produced in such a shape that all of the operating parts of the machine are visible at all times during the manufacture of the fabric, and no manual operations are required other than to replenish the supply of wire and to remove the finished product from the take-up roll.

Although I have herein shown and described only a single form of wire fabric machine embodying my invention, it will be obvious that various changes may be made in the details within the scope of the appended claims without departing from the spirit and scope of my invention.

What is claimed is:

1. A wire fabric machine comprising a frame; a reciprocating wire feeding bed carried by said frame; means for laying wire strands on said bed in crossed relation to one another to form a fabric; and mechanism at the end of said bed remote from said wire laying means, for welding the fabric joints.

2. A wire fabric machine comprising a frame; a welding mechanism at one end of said frame; a feeding bed mounted on said frame behind said welding mechanism; and reciprocating wire carrying means for laying wire strands on said feeding bed in crossed relation to one another to form a diamond mesh fabric.

3. A wire fabric machine comprising a frame; welding mechanism associated with said frame; a reciprocating feeding bed structure carried by said frame for conveying wire strands to said welding mechanism; and intermittently operating wire carrying means for placing wire strands in crossed relation on said bed.

4. A wire fabric machine comprising a frame; an intermittently operating interdigital feeding bed carried by said frame; reciprocating carrier mechanism for withdrawing wire from a spool to form wire strands and for placing them on said bed in the form of a mesh fabric; and mechanism arranged to weld the fabric joints as the fabric is advanced to it by said feeding bed.

5. A wire fabric machine comprising a frame; an intermittently operating interdigital feeding bed carried by said frame; reciprocating carrier mechanism for withdrawing wire from a spool to form wire strands and for placing them on said bed in the form of a mesh fabric; mechanism for welding the joints of the fabric as they are advanced to it by the feeding bed; and means for trimming the edges of the fabric.

6. In a wire fabric machine, a source of wire; a reciprocating carrier for gripping the end of the wire and withdrawing it from said source; means adjacent said source for gripping the wire to subject the withdrawn wire to tension as the carrier approaches the end of its travel away from the source; wire cutting means associated with said gripping means; and means for operating said wire cutting means in timed sequence with the travel of the carrier.

7. In a wire fabric machine a frame; welding mechanism; a plurality of sources of wire; a reciprocating wire carrier associated with each of said sources; means for moving said carriers back and forth across said frame to withdraw wire from said sources and to straighten it; means for severing the wire strands from their sources as the carriers reach the ends of their travel across the frame; an interdigital feeding bed disposed on said frame to receive the wire strands from said carriers; and means for operating said bed intermittently to convey the wire strands to the welding mechanism.

8. In a wire fabric machine a frame; welding mechanism; a plurality of spools of wire; a pair of guides extending diagonally across said frame, one in line with each of said spools, said guides being angularly related and one disposed ahead of the other; a wire gripping device disposed adjacent each of said spools; a reciprocable wire carrier on each of said guides; means for operating said carriers; means for severing the wires from said spools as the carriers reach the ends of their guides remote from the spools; and a wire feeding bed disposed beneath said guides and carriers, to convey the severed wire strands to said welding mechanism.

9. A wire fabric machine comprising a supporting frame; welding mechanism; a wire feeding bed comprising a plurality of sets of parallel bars, said bars each having wire-engaging projections; means for lifting and advancing said sets of bars intermittently and in succession, to convey wire to said welding mechanism; a plurality of spools of wire; and means for drawing wire from said spools, forming strands of a length less than the length of the feeding bed, and laying them on said bed in the form of a diamond mesh fabric.

10. In a wire fabric machine, a wire-feeding bed comprising two sets of parallel supports having wire-engaging projections on their top surfaces; intermittently operating means for raising one set of supports and simultaneously lowering the other set; and means for reciprocating said supports.

11. In a wire fabric machine, a wire-feeding bed comprising two sets of parallel supports having wire-engaging projections on their top surfaces; intermittently operating means for raising one set of supports and simultaneously lowering the other set; and means operating in timed relation with said first-named means for advancing the uppermost set of supports and retracting the other set.

12. In a wire fabric machine, a frame; a reciprocating wire-feeding bed on said frame; welding mechanism; means for actuating said welding mechanism; and means for actuating said feeding bed in timed relation with the operation of the welding mechanism.

13. In a wire fabric machine, a frame; a reciprocating wire-feeding bed on said frame; a source of wire; means for forming wire strands, stretching them, severing them from the source of wire, and dropping them on the bed; and means for operating said first-named means in timed sequence with the operation of said bed.

14. In a wire fabric machine, welding mechanism; a feeding bed for conveying unwelded fabric to said welding mechanism; fabric forming means comprising wire carriers, reciprocable back and forth across said bed, said carriers each including a wire gripping device movable with the carrier; wire gripping and severing means located adjacent the starting position of each of said carriers; and means for operating said fabric forming means to place overlapping wire strands on said bed in timed sequence with the operation of the feeding bed and welding mechanism.

15. In a wire fabric machine including welding mechanism and means for conveying unwelded fabric to it, a source of wire including wire-guiding means; a guide; a wire carrier movable on said guide; means for moving said carrier toward and away from said source; wire gripping means on said carrier; means for normally holding said gripping means closed; and means for releasing said gripping means as the carrier approaches said source.

16. In a wire fabric machine including welding mechanism and means for conveying unwelded fabric to it, a source of wire including wire-guiding means; a guide; a wire carrier movable on said guide; means for moving said carrier toward and away from said source; wire gripping means on said carrier; means for normally holding said gripping means closed; means for releasing said gripping means as the carrier approaches said source; means associated with said source for clamping the wire as the carrier approaches the end of its travel away from said source; and means for releasing the gripping device on the carrier when the carrier reaches the end of its travel away from said source.

17. In a wire fabric machine including welding mechanism and means for conveying unwelded fabric to it, a source of wire including wire-guiding means; a guide; a wire carrier movable on said guide; means for moving said carrier toward and away from said source; wire gripping means on said carrier; means for normally holding said gripping means closed; means adjacent said source for severing the wire when the carrier reaches the end of its travel away from said source; and means for releasing the gripping device on said carrier when the carrier reaches the end of its travel away from said source.

18. In a wire fabric machine, welding mechanism including a rotating element; means for conveying unwelded fabric to said welding mechanism; means for forming wire strands and laying them on said conveying means in crossed relation to one another; cam-operated means connected with said rotating element for operating said conveying means; and other means driven by said rotating element for actuating said wire strand forming and laying means.

19. A wire fabric machine comprising a frame; a reciprocating wire feeding bed carried by said frame; means for forming and laying wire strands diagonally across said bed in two planes, the strands in one plane crossing the strands of the other plane; means for holding said strands on said bed; and welding mechanism at the end of said bed remote from said strands forming and laying means, for welding the strands together at their crossing points.

20. A wire fabric machine comprising a frame; a reciprocating wire feeding bed carried by said frame; means for forming and laying wire strands diagonally across said bed in crossed relation; means for holding said strands in contact with said bed; and welding mechanism at the end of the bed remote from the strand forming and laying means, for welding the strands together at their crossing points.

21. In a wire fabric machine, a welding bar forming one side of an electric circuit; means for feeding crossed wire strands over said bar; an upright frame above said welding bar; a support; a plurality of electrodes carried by said support; a laterally movable support near the bottom of said frame and supporting the bottom ends of said electrode; a rotatable cylinder carrying contacts adapted to engage the top ends of said electrodes in succession, to bring them into contacting relation with the wire strands and with said welding bar, said contacts forming the other side of the electric circuit; and means driven from said cylinder for shifting said laterally movable support into alignment with the strand crossing points.

22. In a wire fabric machine including reciprocating means for conveying crossed wire strands arranged to present rows of staggered joints; a welding mechanism including an upright frame and a rotatable welding roll carried in said frame; a plurality of resiliently mounted spaced electrodes depending from said frame below said roll; a welding bar below said electrodes; means driven from said roll for shifting the lower ends of said electrodes laterally of said welding bar in timed relation with the rotation of the roll, to bring the electrodes into alignment with the wire joints; and means on said welding roll for bringing said electrodes successively into welding relation with said bar.

23. In a wire fabric machine including means for conveying crossed wire strands having rows of staggered joints; joint welding mechanism comprising a plurality of resiliently mounted electrodes capable of lateral movement at their bottom ends, and each composed of two sections resiliently joined; a frame for supporting said electrodes; a welding roll rotatably mounted on said frame; a set of spirally related contacts on said roll, said contacts being arranged to depress said electrodes in succession as the roll rotates; and a welding bar below and cooperating with said electrodes, to weld the wire joints as they are conveyed over the bar.

24. In a wire fabric machine, electric welding mechanism comprising supporting means; a rotatable welding roll carried by said means; a plurality of electric contacts on said roll; a welding bar; a plurality of welding electrodes resiliently carried by said supporting means beneath said roll and capable of vertical movement into contact with said welding bar by engaging the contacts on said roll as the roll rotates; and means driven from said roll for displacing the lower ends of said electrodes laterally once during each rotation of the roll.

25. In a wire fabric machine, a welding mechanism including a rotatable welding roll; means for conveying crossed wire strands to said welding mechanism; rotatable fabric guiding means at the discharge end of the welding mechanism, said guiding means including wheels having teeth adapted to pass through the fabric mesh; and means operated from said welding roll for trimming the edges of the completed fabric as it leaves the welding mechanism.

CHARLES C. WICKWIRE.